United States Patent [19]
Nozawa et al.

[11] Patent Number: 5,491,520
[45] Date of Patent: Feb. 13, 1996

[54] CONTOUR CORRECTING CIRCUIT FOR SHARPENING RISING AND FALLING EDGES OF VIDEO SIGNALS

[75] Inventors: Takahiro Nozawa, Ryugasaki; Yukio Nishizawa, Kawaguchi; Naoki Tanifuji, Hachioji, all of Japan

[73] Assignee: Victor Company of Japan, Ltd., Yokohama, Japan

[21] Appl. No.: 265,727

[22] Filed: Jun. 24, 1994

[30] Foreign Application Priority Data

Jun. 24, 1993 [JP] Japan .................... 5-177340
Jun. 24, 1993 [JP] Japan .................... 5-177341

[51] Int. Cl.⁶ .................................. H04N 5/208
[52] U.S. Cl. .................................. 348/625
[58] Field of Search .................... 348/625, 252, 348/628, 629; 358/35, 37, 162, 166; H04N 5/208, 5/21

[56] References Cited

U.S. PATENT DOCUMENTS

| 4,030,121 | 6/1977 | Faroudja | 358/37 |
| 5,151,787 | 9/1992 | Park | 348/625 |
| 5,293,541 | 3/1994 | Ito | 348/625 |

FOREIGN PATENT DOCUMENTS

| 63-73774 | 4/1988 | Japan . |
| 63-73775 | 4/1988 | Japan . |
| 4241579 | 8/1992 | Japan . |
| 5130454 | 5/1993 | Japan . |
| 5244462 | 9/1993 | Japan . |
| 5316392 | 11/1993 | Japan . |

Primary Examiner—James J. Groody
Assistant Examiner—Sherrie Hsia
Attorney, Agent, or Firm—Jacobson, Price, Holman & Stern

[57] ABSTRACT

A contour correcting circuit sharpens only the rising and falling edges of a video signal, without increasing the shoot levels of the video signal, to improve image sharpness on picture. Second, third, fourth and fifth delayed signals are formed, respectively by delaying an inputted first signal by a first delay time, a second delay time longer than the first delay time, a third delay time longer than the second delay time, and a fourth delay time longer than the third delay time in sequence, respectively. A first contour signal G is formed on the basis of a sixth signal obtained by subtracting the second signal from the third signal and a seventh signal obtained by subtracting the fourth signal from the third signal. A second contour signal representative of contour components is formed on the basis of the first signal, the third signal and the fifth signal. An eighth signal representative of contour emphasizing components is formed on the basis of the first contour signal and the second contour signal. Finally, a contour corrected output signal is outputted by adding the third signal and the eighth signal.

5 Claims, 11 Drawing Sheets

CONTOUR CORRECTING CIRCUIT FOR SHARPENING RISING AND FALLING EDGES OF VIDEO SIGNALS

BACKGROUND OF THE INVENTION

1. Field of the Invention

The present invention relates to a contour correcting circuit for sharpening rising edges and falling edges of video signals for improvement of image sharpness on picture.

2. Description of the Prior Art

Conventionally, there has been used a contour correcting circuit for sharpening the rising and falling edges of video signals in order to improve the obscurity and the lack of resolution of video signals of a TV set, for instance.

FIG. 1 is a block diagram showing an example of the conventional contour correcting circuit. The construction and the operation of this contour correcting circuit will be described hereinbelow with reference to FIG. 2A. FIG. 2A shows the respective waveforms of signals a to g at the respective portions of the circuit shown in FIG. 1.

In FIG. 1, a signal a inputted to an input terminal 1 is applied to a delay circuit 2. The delay circuit 2 outputs a delay signal b delayed by a predetermined time from the signal a. The delayed signal b is applied to another delay circuit 3. The delay circuit 3 outputs another delay signal c delayed by another predetermined time from the signal b.

Further, the signals a and b are applied to a computing circuit 4. The computing circuit 4 subtracts the signal a from the signal b, and outputs a signal d (=b−a). In the same way, the signals b and c are applied to another computing circuit 5. The computing circuit 5 subtracts the signal c from the signal b, and outputs a signal e (=b−c).

These two signals d and e are inputted to an adder 6. The adder 6 adds the two signals d and e, and outputs a signal f (=d+e) (a contour correcting signal). Further, the signal f and the signal b are inputted to another adder 7. The adder 7 adds the two signals f and b, and outputs a signal g (=f+b) (a contour corrected signal).

FIG. 2A indicates that the rising and falling edges of the output signal g are sharpened in comparison with those of the input signal a, so that it is possible to obtain a video signal whose contour is corrected or emphasized so as to provide a sharp image on picture.

In the above-mentioned conventional contour correcting circuit, however, as shown by the waveform g shown in FIG. 2A, preshoots and overshoots (or undershoots) are generated at the edge portions of the output signal g due to the sharpness correction. However, when the sharpness is further required to be increased by sharpening both the rising and falling edges of the output signal g, the addition rate of the contour correcting signal f to the signal b must be increased. In the case where the amplitudes of the rising and falling edges of the contour correcting signal f (as shown in FIG. 2A) are doubled as shown by the signal h in FIG. 2B, since the signal b shown in FIG. 2A is added to the amplitude-doubled contour correcting signal h as shown in FIG. 2B (instead of the signal f shown in FIG. 2A), the output signal i as shown in FIG. 2B is obtained. The obtained signal i is high in both the preshoot and overshoot levels, so that the edges of the output signal i are more sharpened than those of the signal g.

However, when the preshoot and the overshoot levels are emphasized excessively, the contour portions looks as if being bordered in white or black on picture, so that the picture is not natural. Therefore, it is preferable to reduce the preshoot and overshoot levels as much as possible. In the conventional contour correcting circuit, however, when the sharpness is improved by increasing the rising and falling rates of the image signal, since the preshoot and overshoot levels increase with increasing addition rate of the contour correcting signal g to the signal b, an artificiality or an unnaturalness becomes prominent in the corrected image. In other words, in the conventional contour correcting circuit, there exists a problem in that it is impossible to improve the sharpness without increasing the harmful influence of the preshoot and overshoot levels upon the picture quality.

SUMMARY OF THE INVENTION

With these problems in mind therefore, it is the object of the present invention to provide a contour correcting circuit which can eliminate the visual artificiality.

To achieve the above-mentioned object, the present invention provides a contour correcting circuit, comprising: delaying means .for delaying an inputted first signal by a first delay time, a second delay time longer than the first delay time, a third delay time longer than the second delay time, and a fourth delay time longer than the third delay time in sequence, respectively and outputting the respective relayed second, third, fourth and fifth signals, respectively; means for forming a first contour signal on the basis of a sixth signal obtained by subtracting the second signal from the third signal and a seventh signal obtained by subtracting the fourth signal from the third signal; means for forming a second contour signal representative of contour components on the basis of the first signal, the third signal and the fifth signal; means for forming an eighth signal representative of contour emphasizing components on the basis of the first contour signal and the second contour signal; and means for forming a contour corrected output signal by adding the third signal and the eighth signal.

Further, the means for forming the first contour signal comprises: means for adding the sixth signal and the seventh signal; means for amplifying the added signal; and means for clipping signal level of the added and amplified signal whenever the signal level thereof exceeds a predetermined level and for outputting the clipped signal as the first contour signal.

Further, means for forming the second contour signal comprises: means for forming a ninth signal by subtracting the first signal from the third signal; means for forming a tenth signal by subtracting the fifth signal from the third signal; means for forming an eleventh signal having maximum level values of both the ninth signal and the tenth signal; means for forming a twelfth signal having inverted minimum level values of both the ninth signal and the tenth signal; means for forming a thirteenth signal having maximum level values of both the eleventh signal and the twelfth signal; means for forming a fourteenth signal having negative components of minimum level values of both the eleventh signal and the twelfth signal; and means for outputting the second contour signal by subtracting the fourteenth signal from the thirteenth signal.

Further, the means for forming the second contour signal comprises: means for forming a ninth signal having maximum level values of both the first signal and the fifth signal; means for forming a tenth signal having minimum level values of both the first signal and the fifth signal; means for forming an eleventh signal by subtracting the third signal from the ninth signal; means for forming a twelfth signal by subtracting the tenth signal from the third signal; means for forming a thirteenth signal having maximum level values of both the eleventh signal and the twelfth signal; means for forming a fourteenth signal having negative components of minimum level values of both the eleventh signal and the twelfth signal; and means for outputting the second contour signal by subtracting the fourteenth signal from the thirteenth signal.

Furthermore, the means for forming an eighth signal representative of contour emphasizing components comprises: means for multiplying the first and second contour signals; and means for suppressing signal level of the multiplied signal whenever the signal level thereof exceeds a predetermined level, and for outputting the eighth signal.

DETAILED DESCRIPTION OF THE PREFERRED EMBODIMENTS

The embodiments of the contour correcting circuit according to the present invention will be described hereinbelow with reference to the attached drawings.

Figure 3:
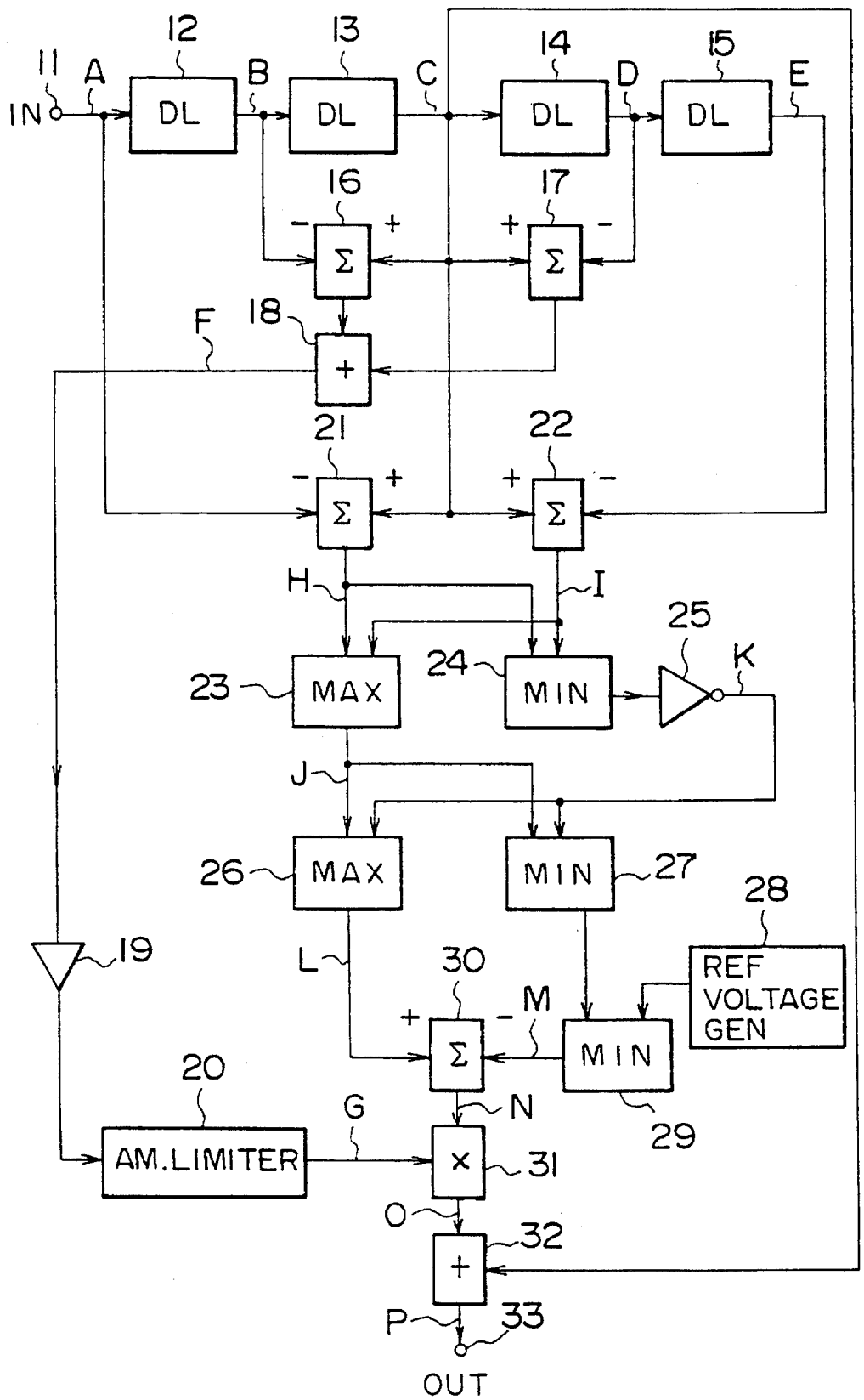
FIG. 3 is a block diagram showing a first embodiment of the contour correcting circuit according to the present invention.
Figure 4:
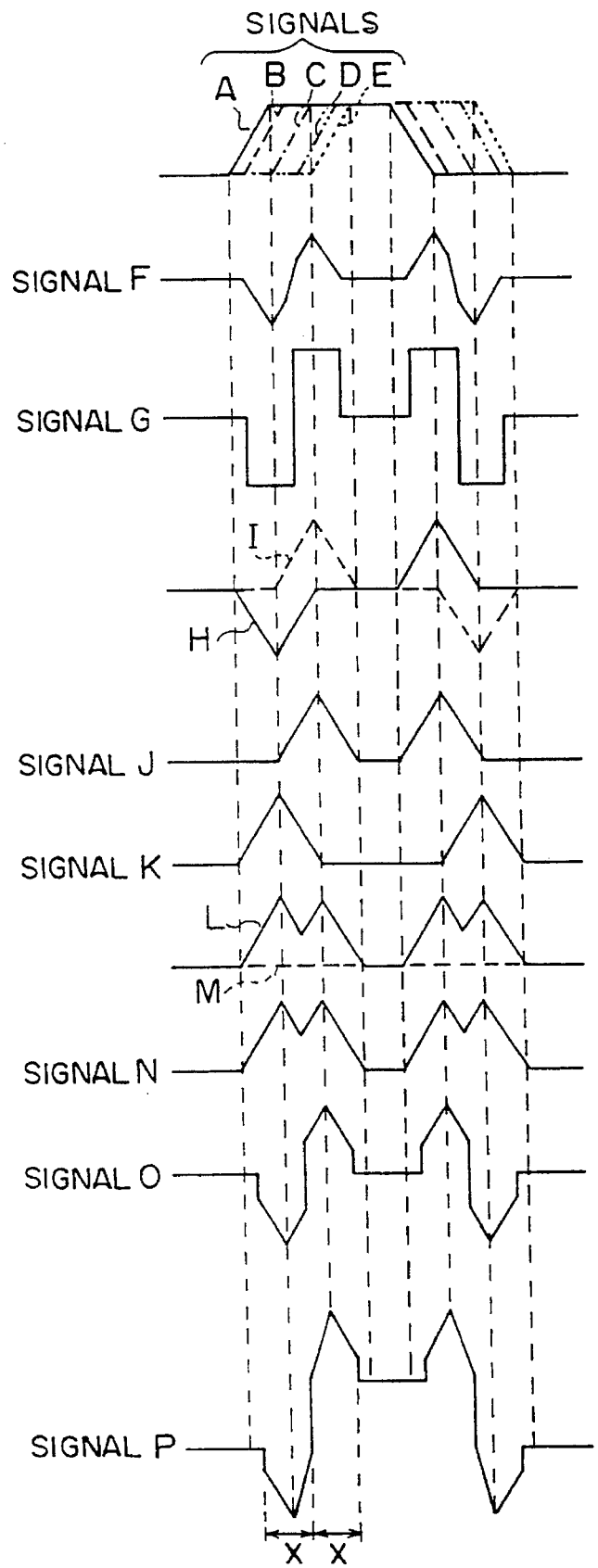
FIG. 4 is a waveform diagram for assistance in explaining the operation of the first embodiment of the contour correcting circuit shown in FIG. 3.

FIG. 3 is a block diagram showing a first embodiment of the contour correcting circuit according to the present invention. The construction and the operation of this first embodiment will be described hereinbelow with reference to FIG. 4. FIG. 4 shows the respective waveforms of the signals A to P at the respective portions of the circuit shown in FIG. 3.

In FIG. 3, a signal A (a first signal) inputted to an input terminal 11 is applied to a delay circuit 12. The delay circuit 12 outputs a delay signal B (a second signal) delayed by a first predetermined time (a first delay time) from the signal A. This delay signal B is inputted to another delay circuit 13. The delay circuit 13 outputs another delay signal C (a third signal) delayed by a second predetermined time from the signal B. The signal C is delayed from the signal A by a second delay time equivalent to the sum total of the delay times of the delay circuits 12 and 13. In this embodiment, the sum total of the delay times of the delay circuits 12 and 13 is determined to be the same as the delay time of the delay circuit 2 shown in FIG. 1 for easy comparison between the two.

In the same way, the signal C (a third signal) is applied to another delay circuit 14. The delay circuit 14 outputs a delay signal D (a fourth signal) delayed by the second predetermined time from the signal C. The signal D is delayed from the signal A by a third delay time equivalent to the sum total of the delay times of the delay circuits 12, 13 and 14. This delay signal D is inputted to another delay circuit 15. The delay circuit 15 outputs another delay signal E (a fifth signal) delayed by the first predetermined time from the signal D. The signal E is delayed from the signal A by a fourth delay time equivalent to the sum total of the delay times of the delay circuits 12, 13, 14 and 15. In this embodiment, the sum total of the delay times of the delay circuits 14 and 15 is determined to be the same as the delay time of the delay circuit 3 shown in FIG. 1 for easy comparison between the two. Further, the delay time increases in the order of the first, second, third and fourth delay times.

Further, the signals B and C are applied to a computing circuit 16. The computing circuit 16 subtracts the signal B from the signal C, and outputs a signal (C–B) (a sixth signal). In the same way, the signals C and D are applied to another computing circuit 17. The computing circuit 17 subtracts the signal D from the signal C, and outputs a signal (C–D) (a seventh signal). The two outputs (the sixth and seventh signals) of the two computing circuits 16 and 17 are inputted to an adder 18. The adder 18 adds the two signals (C–B) and (C–D), and outputs a signal F (=(C–B)+(C–D)). Further, the signal F is amplified by an amplifier 19 and then applied to an amplitude limiter 20. The amplitude limiter 20 outputs a clipped signal G (a first contour signal) whose level beyond a predetermined value is clipped off. The first contour signal G is inputted to a multiplier 31.

On the other hand, the signals A and C are inputted to another computing element 21. The computing element 21 subtracts the signal A from the signal C, and outputs a signal H (=C–A) (a ninth signal). In the same way, the signals C and E are inputted to another computing element 22. The computing element 22 subtracts the signal E from the signal C, and outputs a signal I (=C–E) (a tenth signal). These two signals H and I are inputted to both a maximum value comparator 23 and a minimum value comparator 24, respectively. The maximum value comparator 23 detects higher levels of both the signals H and I, and outputs a signal J (an eleventh signal) having the maximum level values of both the signals H and I. On the other hand, the minimum value comparator 24 detects lower levels of both the signals H and I, and outputs a signal having the minimum level values of both the signals H and I. The obtained signal is inverted by an inversion amplifier 25. This inversion amplifier 25 inverts the output level of the minimum comparator 24, and outputs a signal K (a twelfth signal) having the inverted minimum level values of both the signals H and I. These signals J and K are both inputted to another maximum value comparator 26 and another minimum value comparator 27, respectively.

The maximum value comparator 26 detects higher levels of both the signals J and K, and outputs a signal L (a thirteenth signal) having maximum level values of both the signals J and K. The minimum value comparator 27 detects lower levels of both the signals J and K, and outputs a signal having minimum level values of both the signals J and K. The output of the minimum value comparator 27 is inputted to another minimum value comparator 29 together with a reference voltage outputted by a reference voltage generator 28. Here, the reference voltage is set to a voltage equal to the dc bias voltage of the minimum value comparator 27. Therefore, it is possible to obtain a signal M (a fourteenth signal) which contains only the negative components of the output of the minimum value comparator 27, as the output of the minimum value comparator 29. The signals L and M are both inputted to another computing circuit 30. The computing circuit 30 subtracts the signal M from the signal L, and outputs a signal N (=L–M) (a second contour signal) representative of contour components.

Further, the obtained second contour signal N is inputted to the multiplier 31. The multiplier 31 multiplies the first contour signal G outputted by the amplitude limiter 20 by the second contour signal N, and outputs a contour correcting signal O (an eighth signal) representative of contour emphasizing components. This contour correcting signal O is inputted to another adder 32. The adder 32 adds the signal C outputted by the delay circuit 13 and the contour correcting signal O to form an output signal P which can correct a contour (a contour corrected output signal), and outputs the added output signal P through an output terminal In the first embodiment of the contour correcting circuit as shown in FIG. 3, since the first contour signal G inputted to the multiplier 31 can be obtained by amplifying the signal F and further limiting the level thereof, the rising and falling edges of the first contour signal G are both sharp. Accordingly, the contour correcting signal O obtained by multiplying the first contour signal G by the second contour signal N is also sharp in the edge portions, as shown in FIG. 4.

Figure 2A:
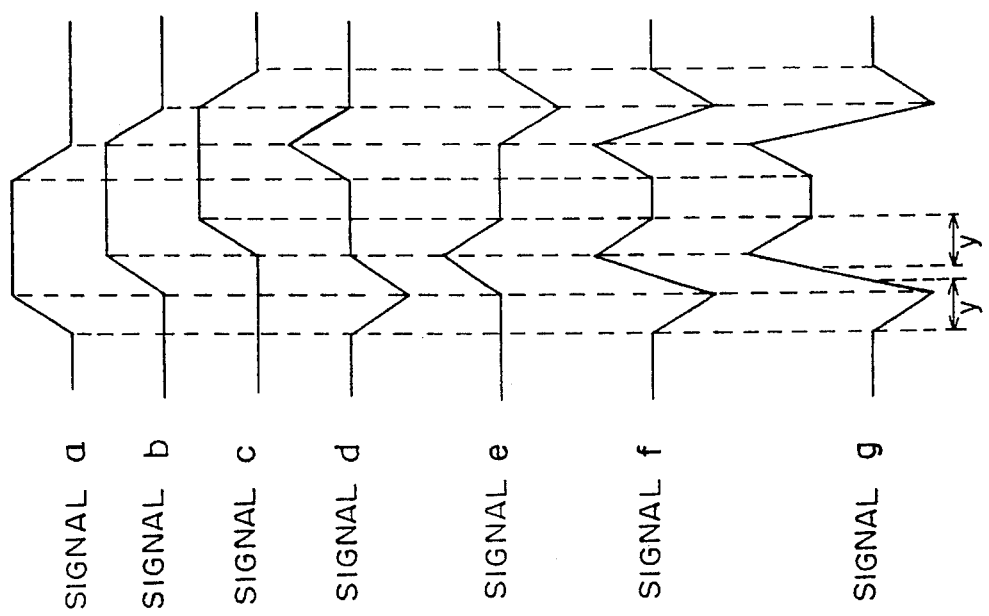
FIGS. 2A and 2B are waveform diagrams for assistance in explaining the operation of the conventional contour correcting circuit.
Figure 2B:
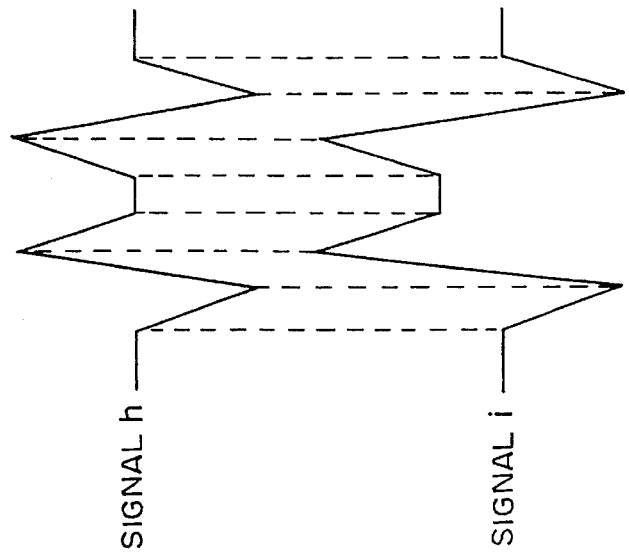

As a result, the rising and falling edges of the contour corrected output signal P are more sharp than those of the output signal g obtained by the conventional circuit as shown in FIG. 2A, In addition, the shoot levels of both the output signal P (in FIG; 4) and the output signal g (in FIG. 2A) are substantially equal to each other in both the circuits. In other words, in the first embodiment, it is possible to improve only the sharpness of the image, without increasing the harmful influence of the preshoot and the overshoot levels of the output signal P upon the picture quality.

Further, it is understood that the shoot widths x of the output signal P (shown in FIG. 4) in the present embodiment are narrower than that y of the output signal g (shown in FIG. 2A) in the conventional circuit. In the conventional circuit, the shoot widths y are determined on the basis of the contour correcting signal f obtained through the addition and subtraction of the signals a, b and c (shown in FIG. 2A). As already described, since the sum total delay time of the delay circuits 12 and 13 shown in FIG. 3 is determined equal to the delay time of the delay circuit 2 shown in FIG. 1 and in addition since the sum total delay time of the delay circuit 14 and 15 shown in FIG. 3 is determined equal to the delay time of the delay circuit 3 shown in FIG. 1, the waveforms of the signals a, b and c (shown in FIG. 2A) are equivalent to those of the signals A, C and E (shown in FIG. 4), respectively. On the other hand, in the present embodiment, the shoot widths x are determined on the basis of the first contour signal G inputted to the multiplier 31, and further the first contour signal G can be obtained through the addition and subtraction of the signals B, C and D. Therefore, it is possible to make narrower the shoot widths x of the invention circuit (determined on the basis of the signals B, C and D) than those y of the conventional circuit (determined on the basis of the signals a, b and c (which correspond to the signals A, C and E)). Further, since the shoot widths x of the output signal P can be adjusted on the basis of the delay times of the delay circuits 13 and 14 (shown in FIG. 3), it is possible to narrow the border width at the contour portion on the picture for elimination of picture artificiality by reducing the shoot widths x, where necessary.

Figure 5:
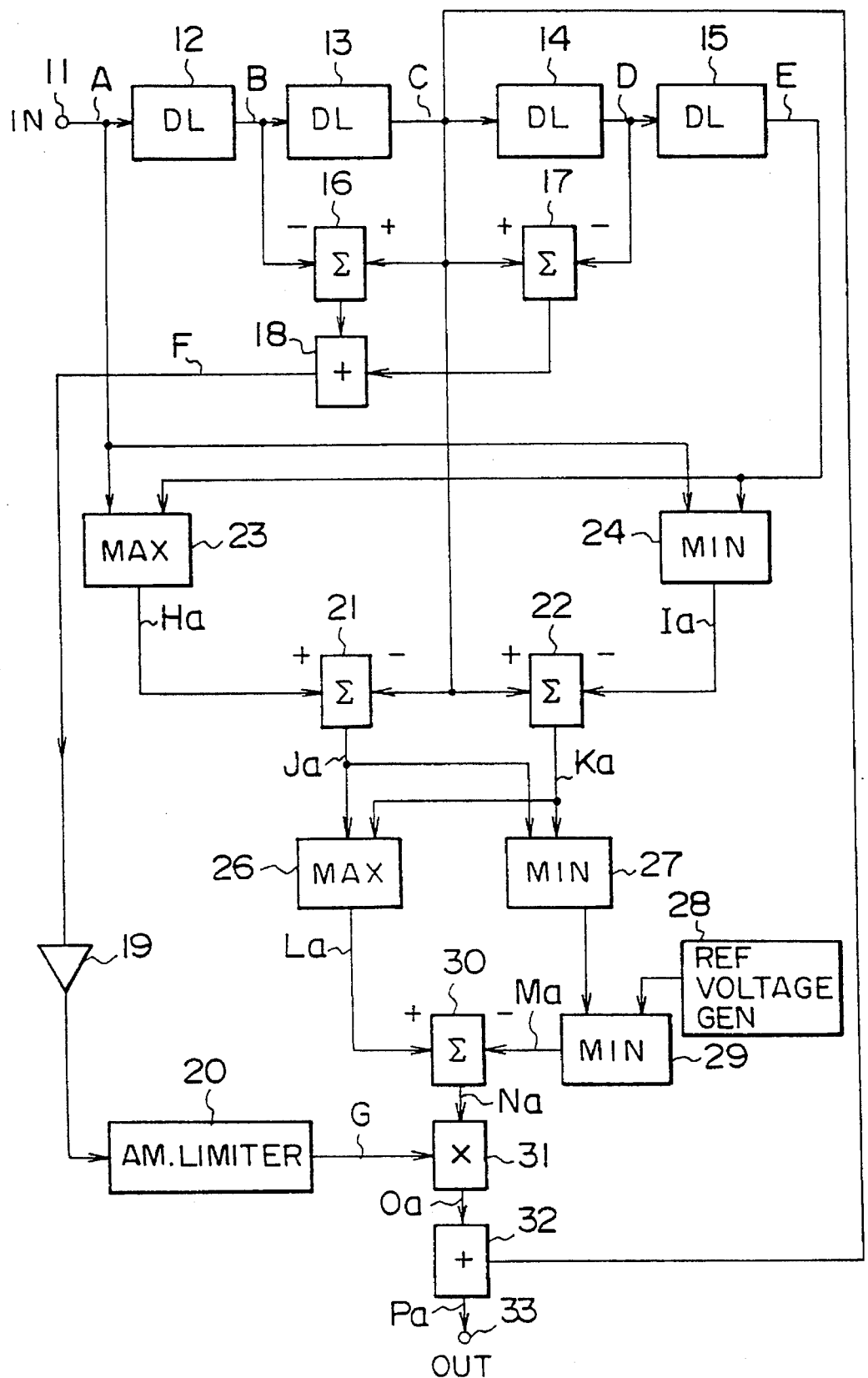
FIG. 5 is a block diagram showing a second embodiment of the contour correcting circuit according to the present invention.
Figure 6:
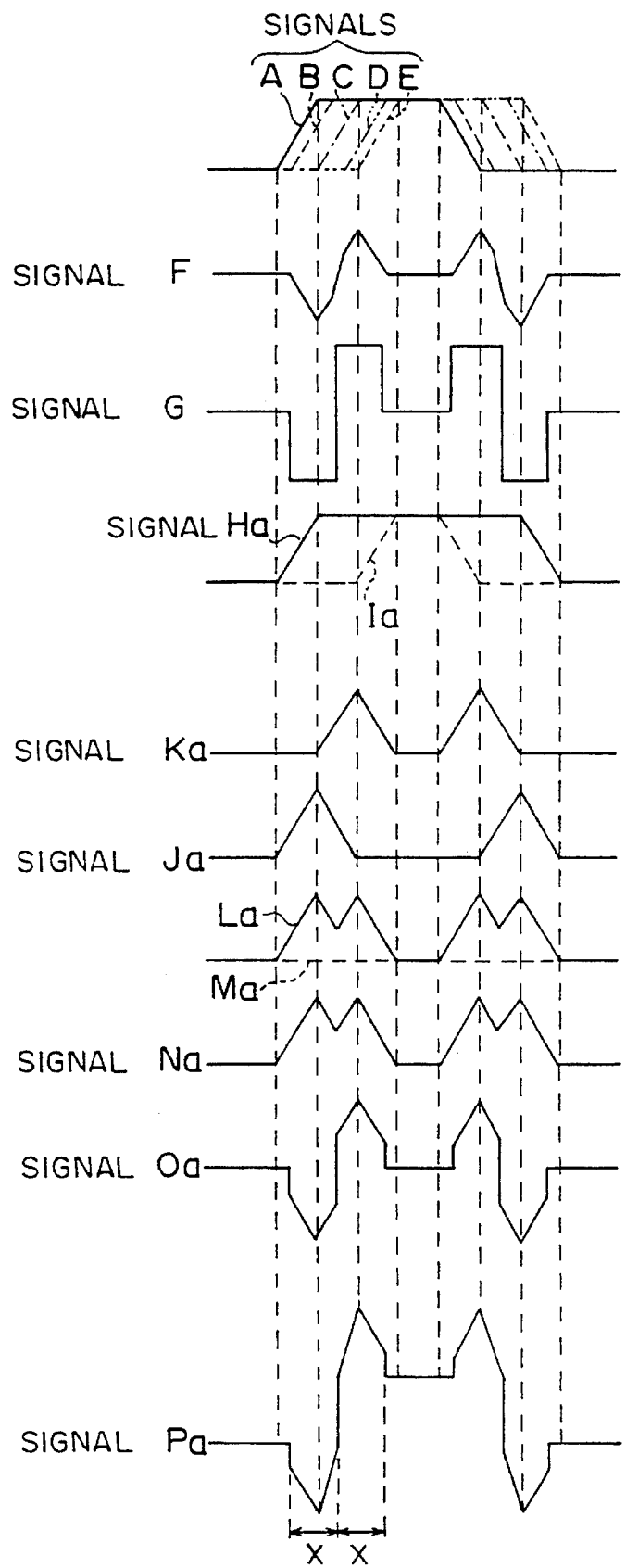
FIG. 6 is a waveform diagram for assistance in explaining the operation of the second embodiment of the contour correcting circuit shown in FIG. 5.

FIG. 5 is a block diagram showing a second embodiment of the contour correcting circuit according to the present invention. The construction and the operation of this second embodiment will be described hereinbelow with reference to FIG. 6. FIG. 6 shows the respective waveforms of the signals A to Pa at the respective portions of -the circuit shown in FIG. 5.

In FIG. 5, a signal A (a first signal) inputted to an input terminal 11 is applied to a delay circuit 12. The delay circuit 12 outputs a delay signal B (a second signal) delayed by a first predetermined time (a first delay time) from the signal A. This delay signal B is inputted to another delay circuit 13. The delay circuit 13 outputs another delay signal C (a third signal) delayed by a second predetermined time from the signal B. The signal C is delayed from the signal A by a second delay time equivalent to the sum total of the delay times of the delay circuits 12 and 13. In this embodiment, the sum total of the delay times of the delay circuits 12 and 13 is determined to be the same as the delay time of the delay circuit 2 shown in FIG. 1 for easy comparison between the two.

In the same way, the signal C (the third signal) is applied to another delay circuit 14. The delay circuit 14 outputs a delay signal D (a fourth signal) delayed by another predetermined time from the signal C. The signal D is delayed from the signal A by a third delay time equivalent to the sum total of the delay times of the delay circuits 12, 13 and 14.

This delay signal D is inputted to another delay circuit 15. The delay circuit 15 outputs another delay signal E (a fifth signal) delayed by the first predetermined time from the signal D. The signal E is delayed from the signal A by a fourth delay time equivalent to the sum total of the delay times of the delay circuits 12, 13, 14 and 15. In this embodiment, the sum total of the delay times of the delay circuits 14 and 15 is determined to be the same as the delay time of the delay circuit 3 shown in FIG. 1 for easy comparison between the two. Further, the delay time increases in the order of the first, second, third and fourth delay times.

Further, the signals B and C are applied to a computing circuit 16. The computing circuit 16 subtracts the signal B from the signal C, and outputs a signal (C–B) (a sixth signal). In the same way, the signals C and D are applied to another computing circuit 17. The computing circuit 17 subtracts the signal D from the signal C, and outputs a signal (C–D) (a seventh signal). The two outputs (the sixth and seventh signals) of the two computing circuits 16 and 17 are inputted to an adder 18. The adder 18 adds the two signals, and outputs a signal F (=(C–B)+(C–D)). Further, the signal F is amplified by an amplifier 19 and then applied to an amplitude limiter 20. The amplitude limiter 20 outputs a clipped signal G (a first contour signal) whose level beyond a predetermined value is clipped off. The first contour signal G is inputted to a multiplier 31.

On the other hand, the two signals A and E are inputted to both a maximum value comparator 23 and a minimum value comparator 24, respectively. The maximum value comparator 23 detects higher levels of both the signals A and E, and outputs a signal Ha (a ninth signal) having the maximum level values of both the signals A and E. On the other hand, the minimum value comparator 24 detects lower levels of both the signals A and E, and outputs a signal Ia (a tenth signal) having the minimum level values of both the signals A and E. The signals Ha and C are inputted to another computing circuit 21. The computing circuit 21 subtracts the signal C from the signal Ha, and outputs a signal Ja (=Ha−C) (an eleventh signal). In the same way, the signals Ia and C are inputted to another computing circuit 22. The computing circuit 22 subtracts the signal Ia from the signal C, and outputs a signal Ka (=C−Ia) (an twelfth signal). These signals Ja and Ka are both inputted to another maximum value comparator 26 and another minimum value comparator 27, respectively.

The maximum value comparator 26 detects higher levels of both the signals Ja and Ka, and outputs a signal La (a thirteenth signal) having the maximum level values of both the signals Ja and Ka. The minimum value comparator 27 detects lower levels of both the signals Ja and Ka, and outputs a signal having the minimum level values of both the signals Ja and Ka. The output of the minimum value comparator 27 is inputted to another minimum value comparator 29 together with a reference voltage outputted by a reference voltage generator 28. Here, the reference voltage is set to a voltage equal to the dc bias voltage of the minimum value comparator 27. Therefore, it is possible to obtain a signal Ma (a fourteenth signal) which contains only the negative components of the output of the minimum value comparator 27, as the output of the minimum value comparator 29. The signals La and Ma are both inputted to another computing circuit 30. The computing circuit 30 subtracts the signal Ma from the signal La, and outputs a signal Na (=La−Ma) (a second contour signal) representative of contour components.

Further, the obtained second contour signal Na is inputted to the multiplier 31. The multiplier 31 multiplies the first contour signal G outputted by the amplitude limiter 20 by the second contour signal Na, and outputs a contour correcting signal Oa (an eighth signal) representative of contour emphasizing components. This contour correcting signal Oa is inputted to another adder 32. The adder 32 adds the signal C outputted by the delay circuit 13 and the contour correcting signal Oa to form an output signal Pa which can correct a contour (a contour corrected output signal), and outputs the contour corrected output signal Pa through an output terminal 33.

In the second embodiment of the contour correcting circuit as shown in FIG. 5, since the first contour signal G inputted to the multiplier 31 can be obtained by amplifying the signal F and further limiting the level thereof, the rising and falling edges of the first contour signal G are both sharp. Accordingly, the contour correcting signal Oa obtained by multiplying the first signal G by the second contour signal Na is also sharp in the edge portions, as shown in FIG. 6.

As a result, the rising and falling edges of the contour corrected output signal Pa are more sharp than those of the output signal g obtained by the conventional circuit as shown in FIG. 2A. In addition, the shoot levels of both the output signal Pa (in FIG. 6) and the output signal g (in FIG. 2A) are equal to each other in both the circuits. In other words, in the second embodiment, it is possible to improve only the sharpness on picture, without increasing the harmful influence of the preshoot and the overshoot levels of the output signal Pa upon the picture quality.

Further, it is understood that the shoot widths x of the output signal Pa (shown in FIG. 6) in the present embodiment is narrower than those y of the output signal g (shown in FIG. 2A) in the conventional circuit. In the conventional circuit, the shoot widths y are determined on the basis of the contour correcting signal f obtained through the addition and subtraction of the signals i, b and c (shown in FIG. 2A). As already described, since the sum total delay time of the delay circuits 12 and 13 shown in FIG. 5 is determined equal to the delay time of the delay circuit 2 shown in FIG. 1 and in addition since the sum total delay time of the delay circuit 14 and 15 shown in FIG. 5 is determined equal to the delay time of the delay circuit 3 shown in FIG. 1, the waveforms of the signals a, b and c (shown in FIG. 2A) are equivalent to those of the signals A, C and E (shown in FIG. 5), respectively. On the other hand, in the present embodiment, the shoot widths x are determined on the basis of the first contour signal G inputted to the multiplier 31, and further the first contour signal G can be obtained through the addition and subtraction of the signals B, C and D. Therefore, it is possible to make narrower the shoot widths x of the invention circuit (determined on the basis of the signals B, C and D) than those y of the conventional circuit (determined on the basis of the signals a, b and c (which correspond to the signals A, C and E)). Further, since the shoot widths x of the output signal Pa can be adjusted on the basis of the delay times of the delay circuits 13 and 14 (shown in FIG. 5), it is possible to narrow the border width at the contour portions on the picture for elimination of picture artificiality by reducing the shoot widths x, where necessary.

Other embodiments of the contour correcting circuit according to the present invention will be described hereinbelow with reference to FIGS. 7 to 11. In these embodiments, the level of the contour correcting signal 0 or Oa representative of contour emphasizing components outputted from the multiplier 31 as shown in FIG. 3 or 5 is controlled by a level correcting circuit in such a way that the preshoot and overshoot levels at the edge portions of the large amplitudes of the signal 0 or Oa are suppressed, before applied to the adder 32.

Prior to the description of these embodiments, the basic operation thereof will be explained with reference to FIG. 7, in which this level correcting circuit of the embodiments is applied to the conventional circuit shown in FIG. 1.

Figure 1:
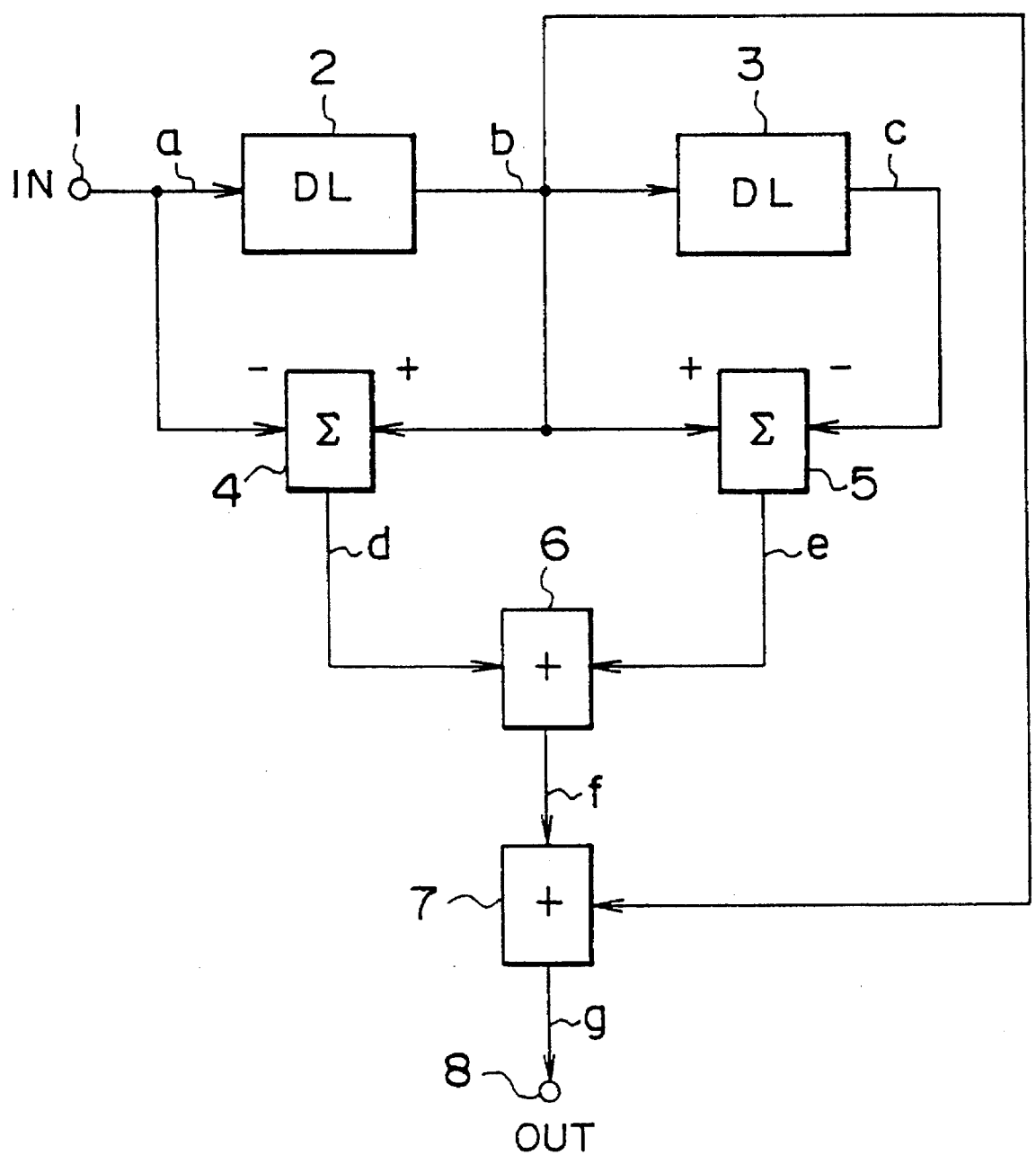
FIG. 1 is a block diagram showing the conventional contour correcting circuit.
Figure 7:
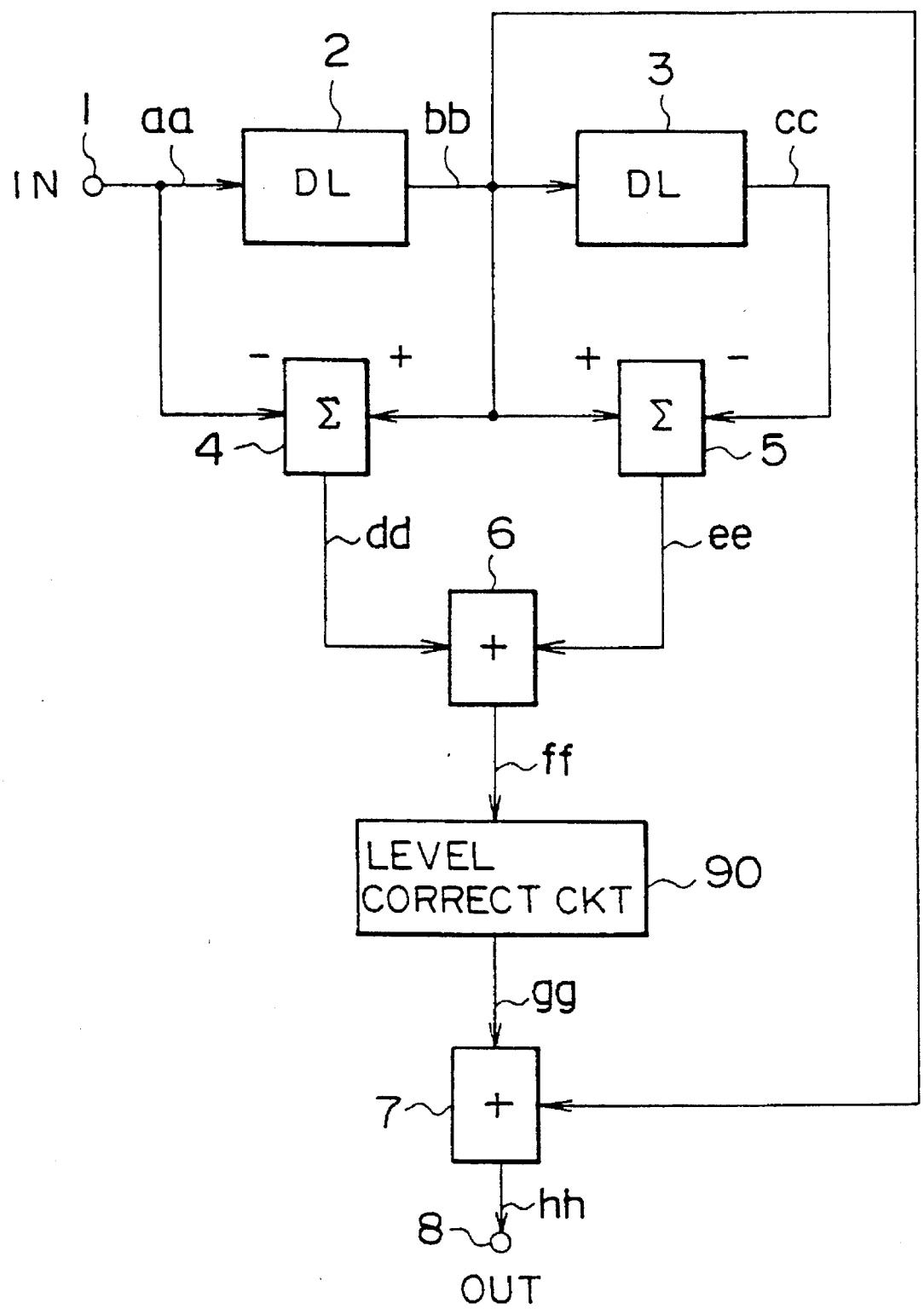
FIG. 7 is a block diagram showing a basic circuit of third and fourth embodiments of the contour correcting circuit according to the present invention.
Figure 8:
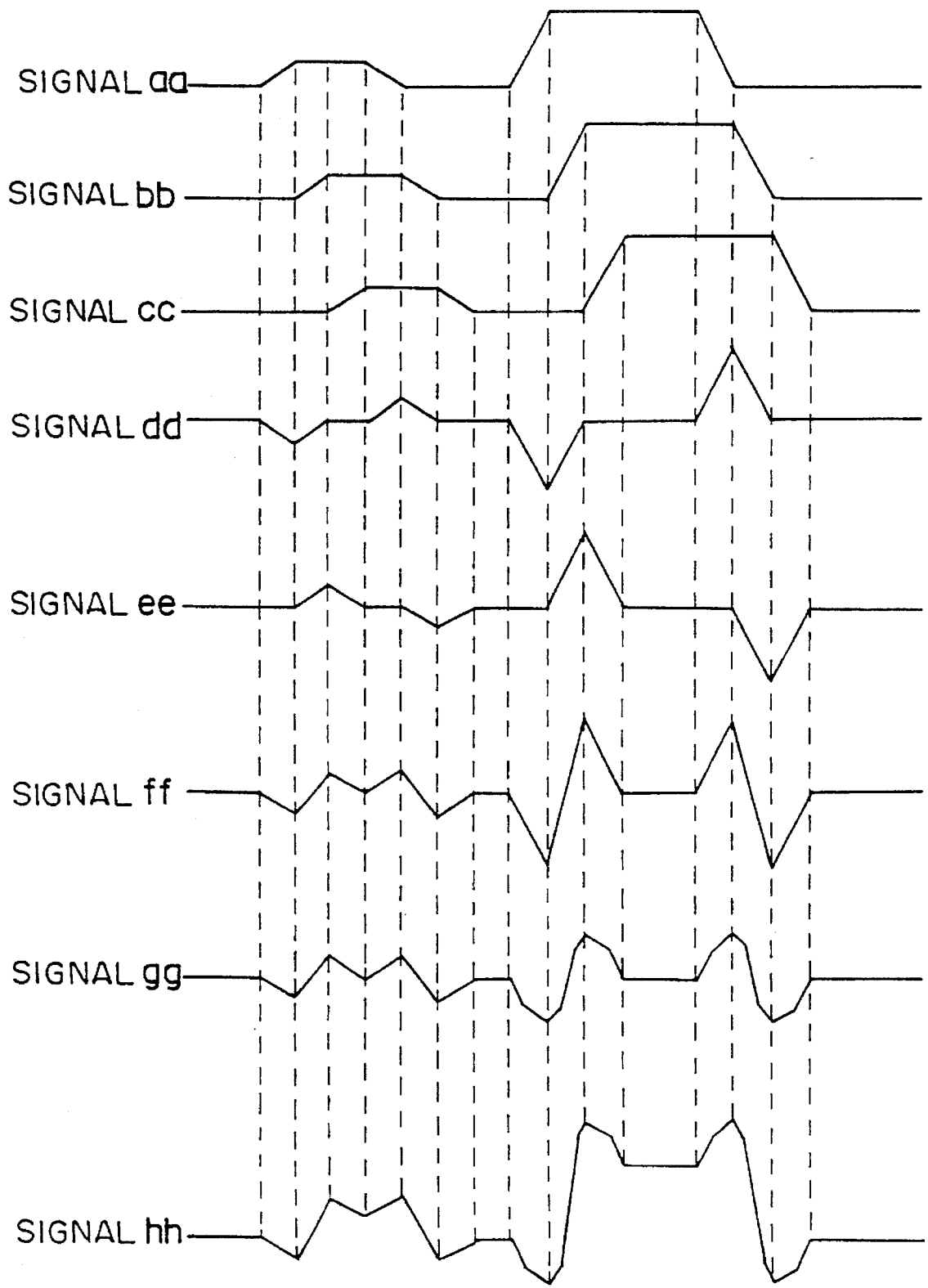
FIG. 8 is a waveform diagram for assistance in explaining the operation of the basic circuit shown in FIG. 7.

In FIG. 7, a level correcting circuit 90 is interposed between the two adders 6 and 7 of the conventional contour correcting circuit shown in FIG. 1. The circuit operation thereof will be described with reference to FIG. 8. FIG. 8 shows the respective waveforms of the respective signals aa to hh at the respective portions aa of the circuit shown in FIG. 7.

In FIG. 7, a signal aa inputted to an input terminal 1 is applied to a delay circuit 2. The delay circuit 2 outputs a delay signal bb delayed by a predetermined time from the signal aa. The delayed signal bb is further delayed by another delay circuit 3. The delay circuit 3 outputs another delay signal cc.

Further, the signals aa and bb are applied to a computing circuit 4. The computing circuit 4 subtracts the signal aa from the signal bb, and outputs a signal dd (=bb−aa). In the same way, the signals bb and cc are applied to another computing circuit 5. The computing circuit 5 subtracts the signal cc from the signal bb, and outputs a signal ee (=bb−cc).

These two signals dd and ee are inputted to an adder 6. The adder 6 adds the two signals dd and ee, and outputs a signal ff (=dd+ee). Further, this signal ff is a contour correcting signal representative of the contour components is applied to a novel level correcting circuit 90 according to the present invention. This level correcting circuit 90 outputs the contour correcting signal ff as it is when the amplitude of the signal ff is lower than a predetermined level but outputs the contour correcting signal ff after suppressing the amplitude when higher than the predetermined level, as described later. The level corrected signal gg outputted by the level correcting circuit 90 is inputted to an adder 7. The adder 7 adds the two signals gg and bb, and outputs a signal hh (=gg+bb).

Figure 9:
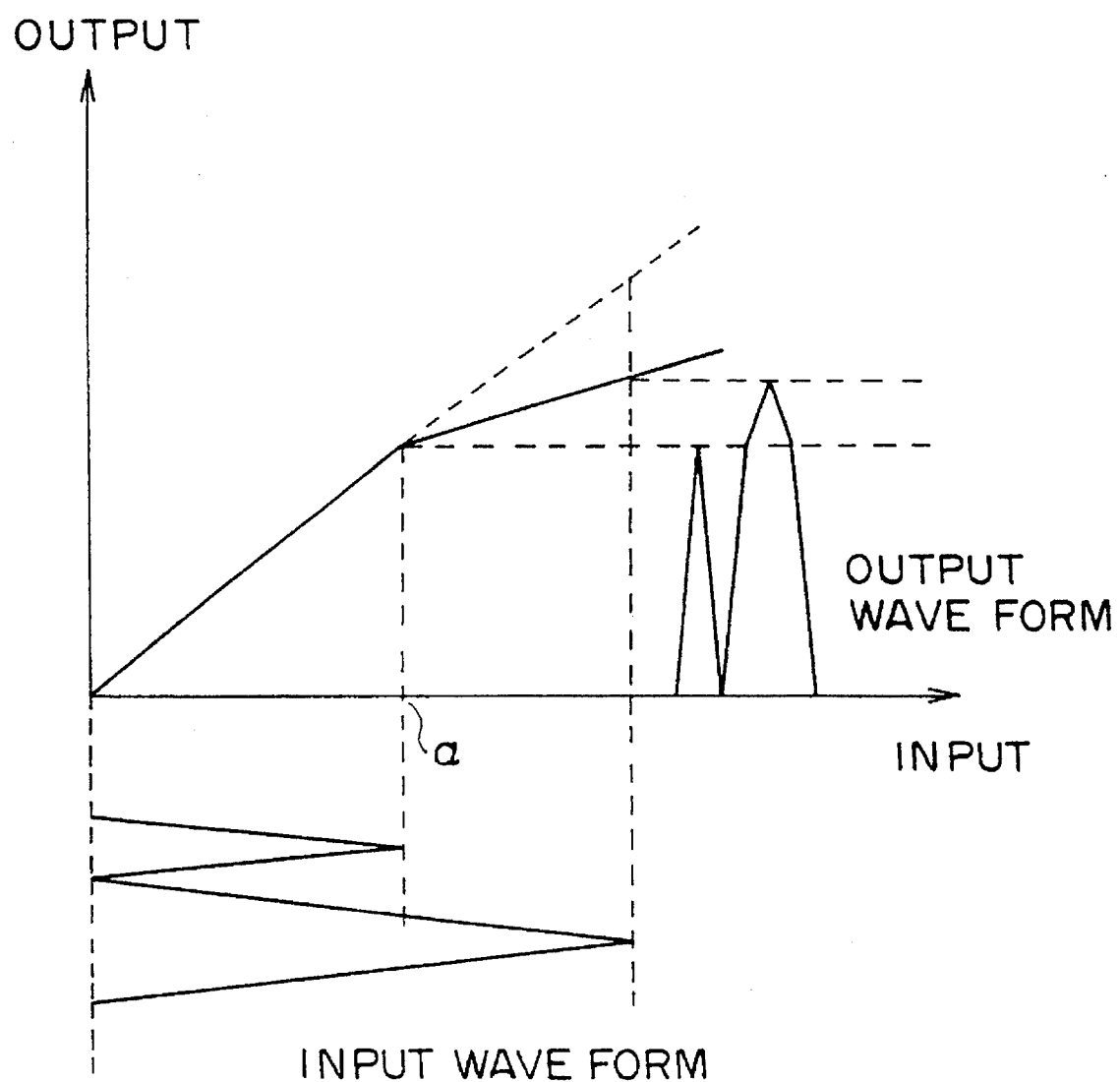
FIG. 9 is a graphical representation showing the characteristics of a level correcting circuit shown in FIG. 7.

With reference to FIG. 9, the input and output characteristics of the level correcting circuit 90 is explained. As shown in FIG. 9, when the level of the input signal applied to the level correcting circuit 90 is less than a predetermined level a, the circuit 90 outputs the input signal as it is. However, when the level of the input signal is higher than the predetermined level a, the circuit 90 outputs the input signal whose level is suppressed. Therefore, where the contour correcting signal ff as shown in FIG. 8 is passed through this level correcting circuit 90, the signal ff changes to a signal gg in which only the large amplitude portions of the signal gg are suppressed. Accordingly, in the output signal hh obtained by adding the signal bb to the signal gg, only the preshoot and overshoot level at only the large amplitude portions are suppressed, as compared with the signal g obtained by the conventional contour correcting circuit as shown in FIG. 2A. As a result, it is possible to reduce such an artificiality that the image is bordered on the picture.

As described above, in the level correcting circuit 90, the overshoot can be suppressed at the large amplitude edge portions of the contour corrected output signal. In contrast with this, however, it is also possible to emphasize only the small amplitude edge portions of the contour corrected signal.

Third and fourth embodiments of the contour correcting circuit will be described hereinbelow with reference to FIGS. 10 and 11, in which the level correcting circuit 90 shown in FIG. 7 is applied to the first and second contour correcting circuits shown in FIGS. 3 and 5, respectively.

Figure 10:
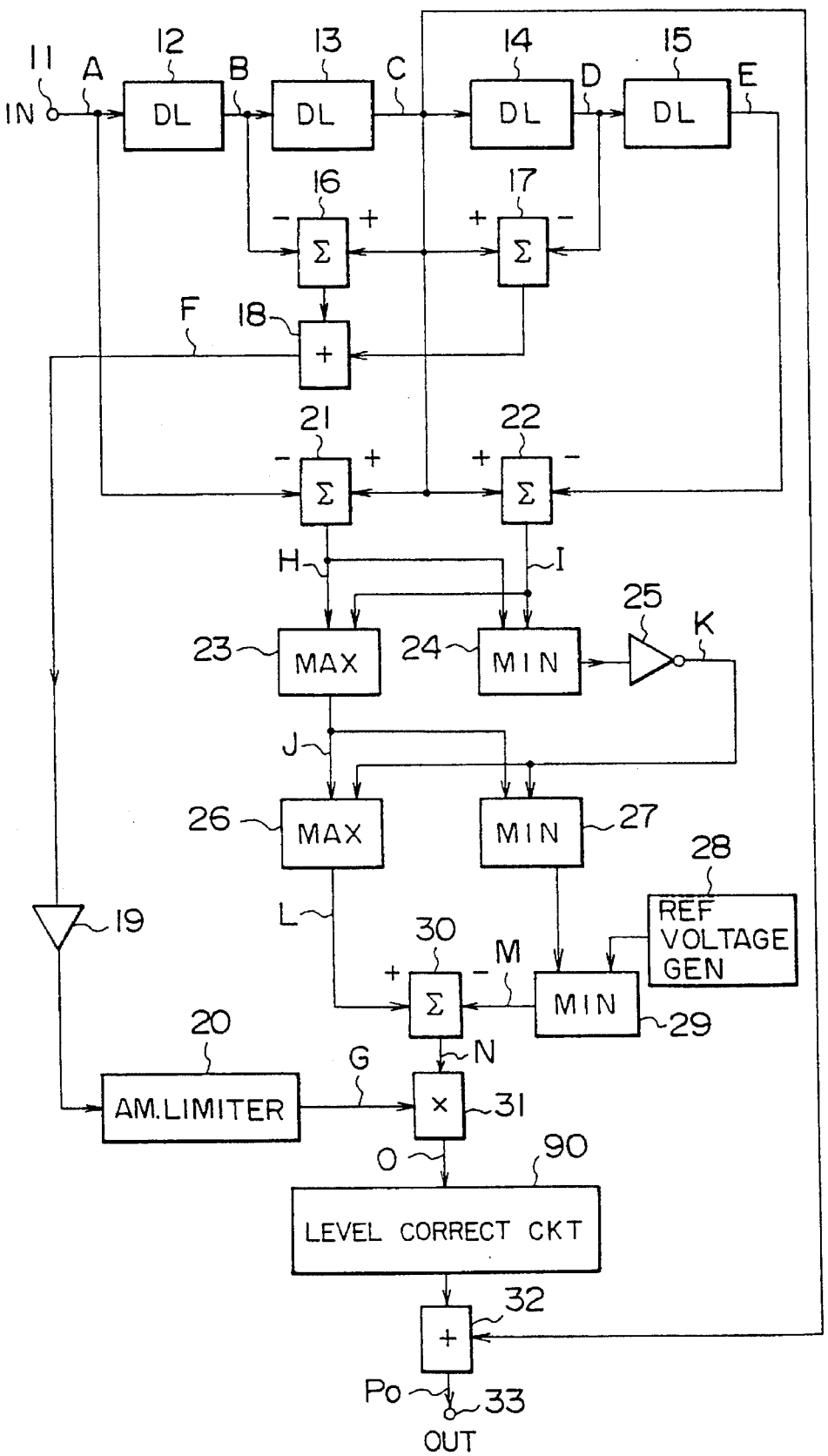
FIG. 10 is a block diagram showing the third embodiment of the contour correcting circuit according to the present invention.
Figure 11:
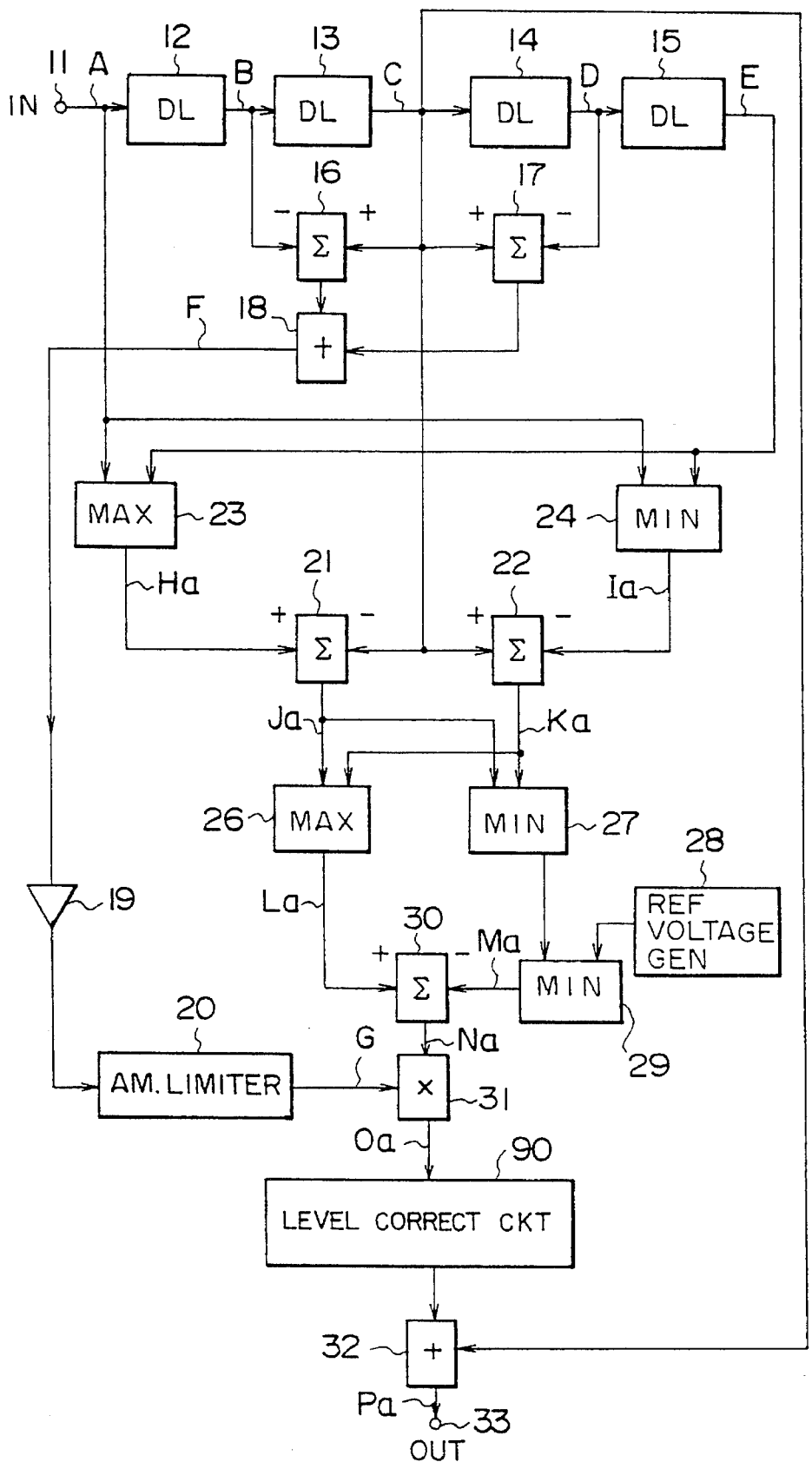
FIG. 11 is a block diagram showing the fourth embodiment of the contour correcting circuit according to the present invention.

In more detail, in FIGS. 10 and 11, the level correcting circuit 90 is interposed between the multiplier 31 and the adder 32. The contour correcting signal 0 or Oa outputted by the multiplier 31 is given to the level correcting circuit 90. In this level correcting circuit 90, as already explained with reference to FIGS. 7 to 9, when the amplitude of the contour correcting signal 0 or Oa is large, the preshoot and overshoot levels at the large amplitude portions thereof are suppressed before the signal 0 or Oa is applied to the adder 32. The adder 32 adds the output signal C and the output signal of the level correcting circuit 90, and outputs the contour corrected signal Po or Pa.

Although not shown, the rising and falling edges of the output signal Po or Pa are more sharp than those of the conventional output signal g shown in FIG. 2A, without increasing the shoot levels. Further, the shoot widths of the output signal Po or Pa are narrower than that of the conventional output signal g. Furthermore, owing to the presence of the level correcting circuit 90, the preshoot and overshoot levels at the large amplitude edge portions of the output signal Po or Pa can be suppressed.

As described above, in the contour correcting circuit according to the present invention, it is possible to sharped the rising and falling edges of the contour corrected output signal, as compared with the conventional contour correcting circuit, without increasing the preshoot and overshoot levels of the output signal. In addition, the shoot widths can be reduced.

Further, in the contour correcting circuit according to the present invention, since the amplitude of the contour corrected output signal beyond a predetermined level can be suppressed, even if the small amplitude edge portions are emphasized, it is possible to suppress the preshoot and overshoot levels at the large amplitude edge portions of the contour corrected output signal.

Consequently, the image sharpness can be improved, while reducing the visual unnaturalness on the picture. Further, the image sharpness can be improved without increasing the artificiality at both the small and large amplitude edge portions of the contour corrected output signal.

What is claimed is:

1. A contour correcting circuit, comprising:

delaying means for delaying an inputted first signal by a first delay time, a second delay time longer than the first delay time, a third delay time longer than the second delay time, and a fourth delay time longer than the third delay time in sequence, respectively and outputting a second signal, a third signal, a fourth signal and a fifth signal delayed by the first, second, third and fourth delay times, respectively;

means for forming a first contour signals on the basis of a sixth signal obtained by subtracting the second signal from the third signal and a seventh signal obtained by subtracting the fourth signal from the third signal;

means for forming a second contour signal representative of contour components on the basis of the first signal, the third signal and the fifth signal;

means for forming an eighth signal representative of contour emphasizing components on the basis of the first contour signal and the second contour signal; and means for forming a contour corrected output signal by adding the third signal and the eighth signal.

2. The contour correcting circuit of claim 1, wherein said means for forming the first contour signal comprises:

means for adding the sixth signal and the seventh signal to create an added signal;

means for amplifying the added signal to create an added and amplified signal; and means for clipping a signal level of the added and amplified signal whenever the signal level exceeds a predetermined level and for outputting a clipped signal as the first contour signal.

3. The contour correcting circuit of claim 1, wherein said means for forming the second contour signal comprises:

means for forming a ninth signal by subtracting the first signal from the third signal;

means for forming a tenth signal by subtracting the fifth signal from the third signal;

means for forming an eleventh signal having maximum level values of both the ninth signal and the tenth signal;

means for forming a twelfth signal having inverted minimum level values of both the ninth signal and the tenth signal;

means for forming a thirteenth signal having maximum level values of both the eleventh signal and the twelfth signal;

means for forming a fourteenth signal having negative components of minimum level values of both the eleventh signal and the twelfth-signal; and means for outputting the second contour signal by subtracting the fourteenth signal from the thirteenth signal.

4. The contour correcting circuit of claim 1, wherein said means for forming the second contour signal comprises:

means for forming a ninth signal having maximum level values of both the first signal and the fifth signal;

means for forming a tenth signal having minimum level values of both the first signal and the fifth signal;

means for forming an eleventh signal by subtracting the third signal from the ninth signal;

means for forming a twelfth signal by subtracting the tenth signal from the third signal;

means for forming a thirteenth signal having maximum level values of both the eleventh signal and the twelfth signal;

means for forming a fourteenth signal having negative components of minimum level values of both the eleventh signal and the twelfth signal; and means for outputting the second contour signal by subtracting the fourteenth signal from the thirteenth signal.

5. The contour correcting circuit of claim 1, wherein said means for forming an eighth signal representative of contour emphasizing components comprises:

means for multiplying the first and second contour signals to output a multiplied signal; and means for suppressing a signal level of the multiplied signal whenever the signal level exceeds a predetermined level, and for outputting the eighth signal.

* * * * *